United States Patent
Tanaka

(10) Patent No.: US 7,544,002 B2
(45) Date of Patent: Jun. 9, 2009

(54) OPTICAL DEVICE

(75) Inventor: Keita Tanaka, Aichi (JP)

(73) Assignee: Sony Corporation (JP)

( * ) Notice: Subject to any disclaimer, the term of this patent is extended or adjusted under 35 U.S.C. 154(b) by 406 days.

(21) Appl. No.: 11/359,414

(22) Filed: Feb. 23, 2006

(65) Prior Publication Data
US 2007/0031141 A1 Feb. 8, 2007

(30) Foreign Application Priority Data
Aug. 3, 2005 (JP) ............................ P2005-063324

(51) Int. Cl.
*G02F 1/00* (2006.01)
*G02B 26/02* (2006.01)
*G02B 5/24* (2006.01)

(52) U.S. Cl. ................... 396/457; 396/506; 359/228; 359/665

(58) Field of Classification Search ............... 396/373, 396/374, 249, 262, 457, 506; 348/220.1, 348/333.01, 333.05; 359/228, 253, 665, 359/886
See application file for complete search history.

(56) References Cited

U.S. PATENT DOCUMENTS

| | | | | |
|---|---|---|---|---|
| 6,702,483 | B2 * | 3/2004 | Tsuboi et al. ............ | 396/449 |
| 6,806,988 | B2 | 10/2004 | Onuki et al. | |
| 6,943,841 | B2 * | 9/2005 | Miyake et al. ......... | 348/333.05 |
| 7,388,705 | B2 * | 6/2008 | Onuki et al. ............ | 359/253 |
| 2001/0017985 | A1 * | 8/2001 | Tsuboi et al. ............ | 396/506 |
| 2005/0041132 | A1 * | 2/2005 | Juen et al. ............ | 348/333.12 |

FOREIGN PATENT DOCUMENTS

| | | |
|---|---|---|
| JP | 2001-228307 | 8/2001 |
| JP | 2002-055286 | 2/2002 |
| JP | 2002-169005 A | 6/2002 |
| JP | 2003-158684 | 5/2003 |
| WO | WO-2004/027489 A1 | 4/2004 |

OTHER PUBLICATIONS

EPO Search Report mailed on Jul. 21, 2006.
European Patent Office Communication pursuant to Article 94(3) issued on Jul. 17, 2008 for corresponding European Application No. 06 110 849.4-2217.
Japanese Office Action for application No. 2005-063324 dated Jan. 28, 2009.

* cited by examiner

*Primary Examiner*—W. B. Perkey
(74) *Attorney, Agent, or Firm*—Rader Fishman & Grauer PLLC; Ronald P. Kananen

(57) ABSTRACT

An optical device includes: a sealed container having edge walls facing each other in a thickness direction of the container and a side wall connecting both of the edge walls; a first liquid with polarity or electrical conductivity and sealed within the container; a second liquid that is sealed within the container and does not mix with the first liquid; and a voltage applying unit for applying a voltage across the first liquid. The first liquid and the second liquid have equal specific gravity, and transmissivity of the first liquid is lower than the transmissivity of the second liquid. An interface between the first liquid and the second liquid changes shape in response to a voltage applied by the voltage applying unit. A light transmission path that passes through the edge walls and extends in a direction of the thickness of the container is formed.

19 Claims, 9 Drawing Sheets

| | GROUP A | GROUP B | GROUP C | GROUP D |
|---|---|---|---|---|
| REFRACTIVE INDEX | 1.32 ~ 1.41 | 1.32 ~ 1.41 | 1.41 ~ 1.63 | 1.41 ~ 1.6 |
| SPECIFIC GRAVITY | 0.9 ~ 1.2 | 0.6 ~ 0.9 | 1.05 ~ 1.7 | 0.8 ~ 1.05 |

FIG. 11

SOLVENT DATA

| | | REFRACTIVE INDEX | SPECIFIC GRAVITY |
|---|---|---|---|
| GROUP A | WATER | 1.333 | 1 |
| | NITROMETHANE | 1.38056 | 1.1322 |
| | ACETIC ANHYDRIDE | 1.3904 | 1.082 |
| | METHYL ACETATE | 1.3614 | 0.9342 |
| | ETHYL ACETATE | 1.3719 | 0.902 |
| GROUP B | METHANOL | 1.3292 | 0.7915 |
| | ACETONITRILE | 1.34604 | 0.78745 |
| | ACETONE | 1.3591 | 0.788 |
| | ETHANOL | 1.361 | 0.789 |
| | PROPIONITRILE | 1.36585 | 0.7718 |
| | TETRAHYDROFURAN | 1.407 | 0.8892 |
| | n-HEXANE | 1.375 | 0.66 |
| | 2-PROPANOL | 1.37723 | 0.78505 |
| | 2-BUTANE | 1.3814 | 0.805 |
| | n-BUTYRONITRILE | 1.38385 | 0.7954 |
| | 1-PROPANOL | 1.3862 | 0.8053 |
| | 1-BUTANOL | 1.3993 | 0.81 |
| GROUP C | DIMETHYLSULFOXIDE | 1.4795 | 1.1 |
| | CHLOROBENZENE | 1.5248 | 1.107 |
| | ETHYLENEGLYCOL | 1.43063 | 1.1135 |
| | FORMAMIDE | 1.44754 | 1.1334 |
| | NITROBENZENE | 1.5529 | 1.205 |
| | PROPYLENE CARBONATE | 1.4209 | 1.2065 |
| | 1,2-DICHLOROETHANE | 1.4443 | 1.2569 |
| | CARBON DISULFIDE | 1.62803 | 1.2632 |
| | CHLOROFORM | 1.4476 | 1.484 |
| | BROMOBENZENE | 1.5602 | 1.4952 |
| | CARBON TETRACHLORIDE | 1.4607 | 1.589 |
| | TRICHLOROACETIC ANHYDRIDE | 1.484 | 1.69 |
| GROUP D | TOLUENE | 1.4967 | 0.866 |
| | BENZENE | 1.50108 | 0.8787 |
| | ETHYLENEDIAMINE | 1.454 | 0.898 |
| | N,N-DIMETHYLACETAMIDE | 1.423 | 0.9429 |
| | N,N-DIMETHYLFORMAMIDE | 1.42803 | 0.9445 |
| | TRIBUTYL PHOSPHATE | 1.4215 | 0.976 |
| | PYRIDINE | 1.5092 | 0.98272 |
| | BENZONITRILE | 1.5289 | 1.01 |
| | ANILINE | 1.5863 | 1.022 |
| | 1,4-DIOXANE | 1.4175 | 1.029 |
| | HEXAMETHYLPHOSPHORAMIDE | 1.4579 | 1.0295 |

OPTICAL DEVICE

BACKGROUND OF THE INVENTION

1. Field of the Invention

The present invention relates to an optical device.

2. Description of Related Art

An optical device that adjusts the amount of light to be transmitted by means of electrocapillarity (electrowetting) is proposed (For example, see Japanese Patent Application Publication No. 2001-228307).

Such an optical device 10 includes, as shown in FIG. 12A, a sealed container 16 that includes edge walls 12 that face each other in the direction of the thickness of the container 16 and a side wall 14 that connects both of the edge walls 12, a first liquid 20 having polarity or electrical conductivity that is sealed within the container 16, and a second liquid 22 that is sealed within the container 16 and that has a higher transmissivity than the first liquid 20.

Liquids having such properties that they do not mix with each other are used as the first liquid 20 and the second liquid 22, and further, liquids having the same specific gravity are used as the first liquid 20 and the second liquid 22, so that when only the first liquid 20 and the second liquid 22 are sealed within the container 16 without getting air or the like mixed therein, the initial state in which only the first liquid 20 and the second liquid 22 were sealed within the container 16 is maintained even if the container 16 is rotated or shaken, and a state where an interface 24 is roughly parallel to the edge walls 12 is maintained.

Reference numerals 28 in the drawing is an electrode for applying a voltage across the first liquid 20, and reference numerals 30 is an insulation film covering the electrode 28.

By applying a voltage across the first liquid 20 with the above-mentioned electrode 28, the shape of the interface 24 between the first liquid 20 and the second liquid 22 is altered between the gap shown with the solid line and the broken line in FIG. 12A due to electrocapillarity, and thus, a light transmission path 18 that passes through the edge walls 12 and extends in the direction of the thickness of the container 16 is formed.

Specifically, in a state where no voltage is applied, by having the first liquid 20 extend, as indicated by the solid line in FIG. 12A, over the entire area in a direction that is orthogonal to the direction in which light is transmitted, transmission of light is prevented or suppressed, and as the applied voltage is increased, the transmission path 18 is formed by having the second liquid 22 come into contact with both of the edge walls 12 as indicated by the broken line in FIG. 12A, and the size of the transmission path 18 is adjusted by adjusting the applied voltage, thereby increasing or decreasing the contact area between the second liquid 22 and one of the edge walls 12.

SUMMARY OF THE INVENTION

In such a optical device 10 in related art, a water-repellant film 26 for making the movement of the first and second liquids 20 and 22 smooth are formed on the inner side of the side wall 14. The angle of contact θ formed between the first liquid 20 and the water-repellant films 26 is determined by the properties of the two, and the angle of contact θ is smaller than 90 degrees.

As shown in FIG. 12B, as the dimensions of the optical device 10 is reduced along the direction of light transmission (the dimension in the direction of its thickness), while it may be possible to block the light transmission path 18 by having the first liquid 20, in a state where no voltage is applied, extend along the entire area in a direction orthogonal to the direction of light transmission, cases may arise where the light transmission path 18 cannot be formed since the second liquid 22 can only come into contact with one of the edge walls 12, as shown in FIG. 12C, in a state where some voltage is applied.

Such an occurrence is due to the fact that the angle of contact θ formed between the first liquid 20 and the water-repellant film 26 is of a value smaller then 90 degrees and to the fact that the interface 24 forms a curved convex surface (including a spherical surface) that curves out from the first liquid 20 toward the second liquid 22 in the thickness direction.

Thus, conventionally, there is a limit in terms of the miniaturization of the dimension of the optical device 10, which adjusts by means of electrocapillarity (electrowetting) the amount of light to be transmitted, in the direction in which light is transmitted (the dimension in the thickness direction).

On the other hand, miniaturization of imaging devices into which such optical devices 10 are incorporated is sought after, and how to achieve miniaturization of the dimension of the optical device 10 in the direction in which light is transmitted (the dimension in the direction of its thickness) is becoming an important issue.

The present invention is made in view of such circumstances, and seeks to provide an optical device that is advantageous in advancing miniaturization.

According to an embodiment of the present invention, there is provided an optical device including: a sealed container that has edge walls and a side wall, the edge walls facing each other in a thickness direction of the container, the side wall connecting both of the edge walls; a first liquid that has polarity or electrical conductivity, the first liquid being sealed within the container; a second liquid that is sealed within the container and does not mix with the first liquid; and a voltage applying unit for applying a voltage across the first liquid. The first liquid and the second liquid have equal specific gravity, and transmissivity of the first liquid is lower than the transmissivity of the second liquid. Furthermore, an interface between the first liquid and the second liquid changes shape in response to a voltage applied by the voltage applying unit. Furthermore, a light transmission path that passes through the edge walls and extends in a direction of the thickness of the container is formed. Furthermore, a hydrophilic film that is formed on a portion inside the side wall corresponding to the first liquid, wettability of the hydrophilic film with respect to the first liquid being higher than wettability of the hydrophilic film with respect to the second liquid. Furthermore, a water-repellant film that is formed on a portion inside the side wall corresponding to the second liquid, wettability of the water-repellant film with respect to the second liquid being higher than wettability of the water-repellant film with respect to the first liquid.

According to the present invention, when no voltage is applied, the interface between the first and second liquids is flat. Accordingly, even if the dimension of the optical device is reduced in the direction in which light is transmitted, it is possible, unlike the optical devices in the related art, to reliably bring the second liquid into contact with both of the edge walls in a state where a voltage is applied.

Accordingly, it is possible to reliably form a light transmission path in a state where a voltage is applied, and is thus advantageous in obtaining smaller and thinner optical devices.

BRIEF DESCRIPTION OF THE DRAWINGS

FIG. 2A shows a state before applying a voltage and FIG. 2B shows a state after a voltage is applied;

FIG. 11 is a table indicating the values of specific gravity and refractive index of various kinds of liquids used; FIG. 12A is a diagram indicating a configuration in which ample thickness is secured for a container, FIG. 12B is a diagram indicating a state where a light transmission path is blocked in a case where the dimension of a container in the thickness direction is reduced, and FIG. 12C is a diagram indicating a state where a light transmission path cannot be formed in a case where the dimension of the container in the thickness direction is reduced.

DETAILED DESCRIPTION OF THE EMBODIMENTS

The issues discussed above are addressed by forming a hydrophilic film on a portion of the inner surface of the side wall of the container corresponding to the first liquid and by forming a water-repellant film on a portion of the inner surface of the side wall of the container corresponding to the second liquid.

Next, an embodiment of the present invention will be described with reference to the drawings.

First, the principles of electrocapillarity (electrowetting) that is made use of in the optical device of the present invention will be described.

Figure 2A:
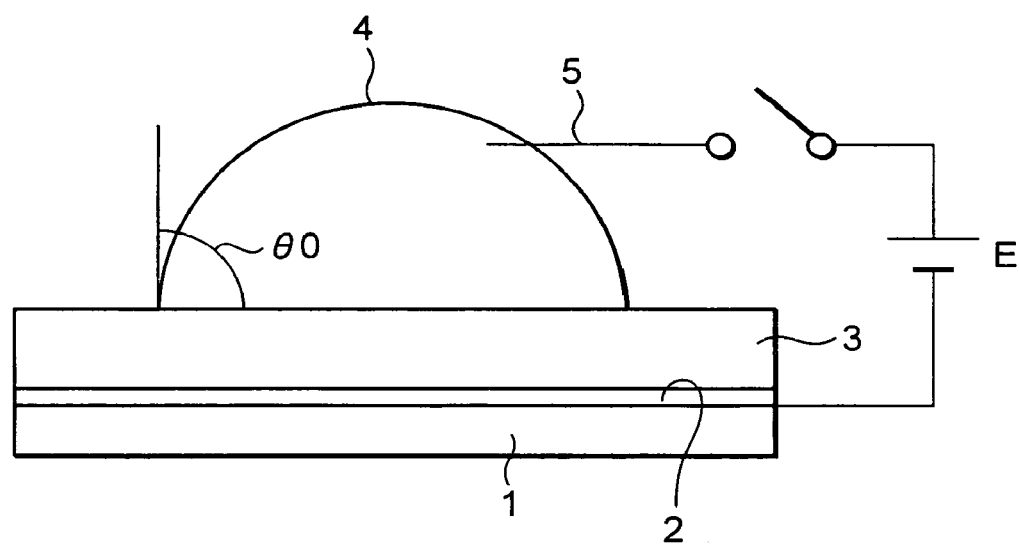
FIGS. 2A and 2B illustrate the principles of electrocapillarity, where
Figure 2B:
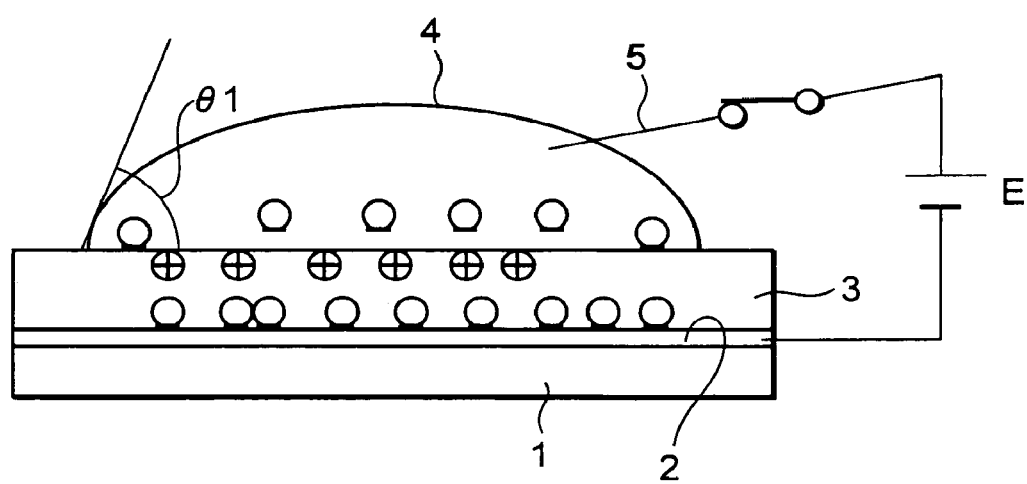

FIGS. 2A and 2B illustrate the principles of electrocapillarity. FIG. 2A shows a state before a voltage is applied, and FIG. 2B shows a state after a voltage is applied.

As shown in FIG. 2A, a first electrode 2 is formed on the surface of a substrate 1, and an insulation film 3 is formed on the surface of this electrode 2.

On the surface of this insulation film 3 is located a first liquid 4 that possesses polarity or electrical conductivity, and a second electrode 5 is electrically connected to the first liquid 4.

As shown in FIG. 2A, in a state where a voltage E is not applied across the first electrode 2 and the second electrode 5, the surface of the first liquid 4 forms an approximately spherical shape arching upward due to surface tension. At this point, the angle θ formed between the surface of the insulation film 3 and the liquid surface where the first liquid 4 is in contact with the insulation film 3, in other words the angle of contact θ, is taken to be θ0.

However, as shown in FIG. 2B, when the voltage E is applied across the first electrode 2 and the second electrode 5, an electrical field (electrostatic force) affects the particles constituting the first liquid 4 as a build-up of, for example, positive charge takes place on the surface of the insulation film 3. Thus, particles constituting the first liquid 4 are attracted, the wettability of the first liquid 4 with respect to the insulation film 3 improves, and the angle of contact θ becomes θ1, which is smaller than θ0. Further, the angle of contact θ becomes smaller as the value of voltage E increases.

This is called electrocapillarity.

Next, an optical device 40 of the present embodiment will be described.

Figure 1:
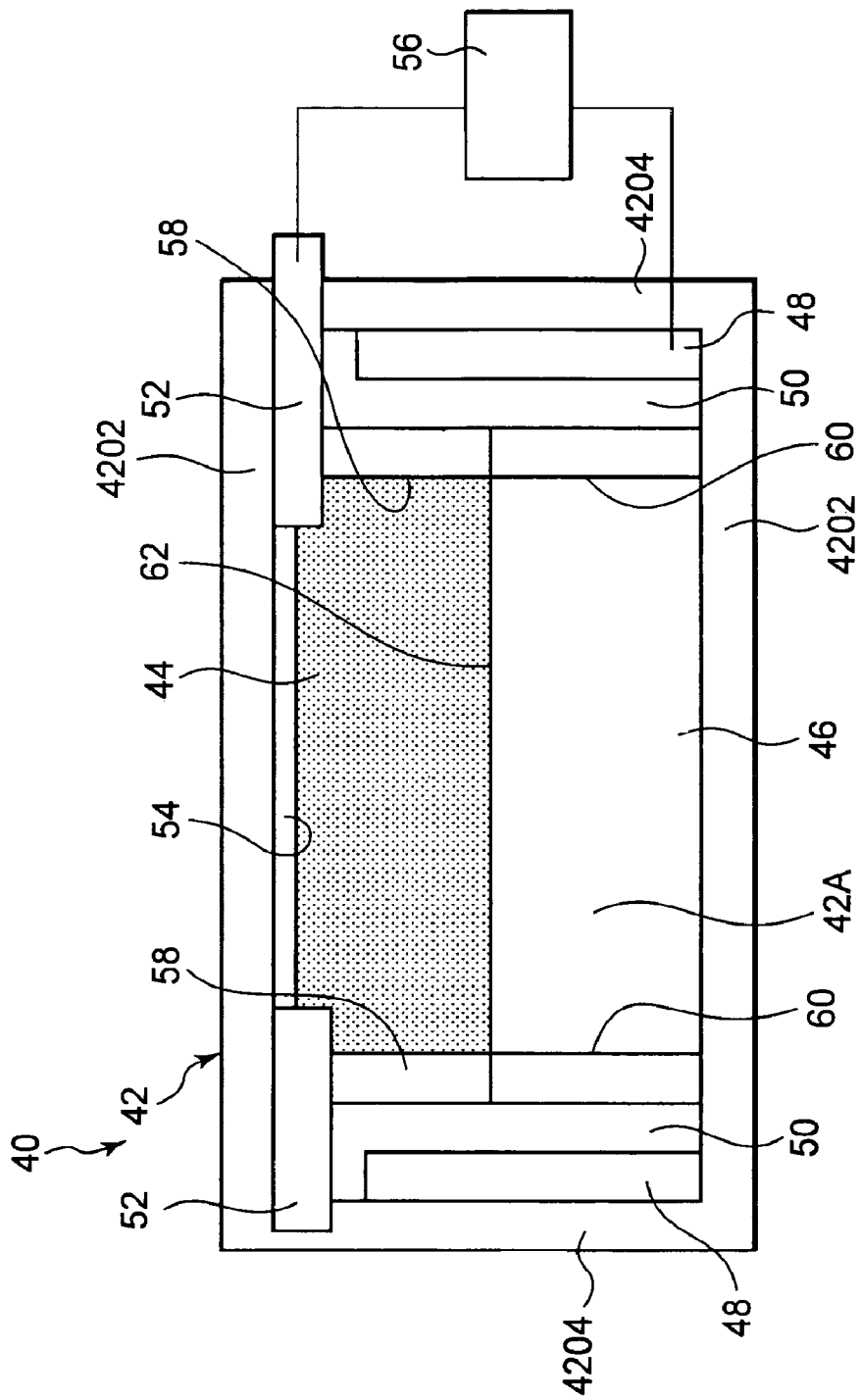
FIG. 1 is a sectional view indicating the configuration of an optical device in an embodiment of the present invention.

FIG. 1 is a sectional view indicating the configuration of the optical device 40 in the present embodiment.

As shown in FIG. 1, the optical device 40 includes a container 42, a first liquid 44, a second liquid 46 and a voltage applying unit.

The container 42 includes edge walls 4202 that face each other in the direction of the thickness of the container 42, a side wall 4204 that connects both of the edge walls 4202, and a receptacle space 42A that is sealed by these edge walls 4202 and side wall 4204.

In the present embodiment, the edge walls 4202 take on the form of disk-like plates, the side wall 4204 takes on the form of a hollow cylinder having the same outer diameter as the outer diameter of the edge walls 4202, and the receptacle space 42A takes on the form of a flat cylinder.

In addition, the edge walls 4202 and the side wall 4204 are made of insulative materials, and the edge walls 4202 are made of a transparent material that allows the transmission of light.

As materials for the edge walls 4202, for example, synthetic resin materials that are transparent and have insulative properties, or transparent glass materials may be used.

On the inside of the side wall 4204 is formed in the shape of a hollow cylinder a first electrode 48 (negative electrode) that extends along the entire circumference of the side wall 4204, and on the entire circumference of the inside of the first electrode 48 is formed in the shape of a hollow cylinder an insulation film 50 so as to cover all of the first electrode 48.

On a place on the inner surface of one of the two edge walls 4204 and toward its outer circumference is formed a second electrode 52 (positive electrode) that extends in the shape of a ring that is concentric with this edge wall 4204. The second electrode 52 exposes part of its inner circumference in the receptacle space 42A, and the second electrode 52 is insulated from the first electrode 48 by the insulation film 50.

On a place on the inner surface of one of the two edge walls 4204 and over the entire area within the second electrode 50 is formed a transparent hydrophilic film 54 that allows transmission of light. The hydrophilic film 54 is so formed that its wettability with respect to the first liquid 44 is higher than its wettability with respect to the second liquid 46.

A power source 56 with a variable output voltage is provided on the outside of the container 42. The negative voltage output terminal of the power source 56 is electrically connected to the first electrode 48, and the positive voltage output terminal of the power source 56 is electrically connected to the second electrode 52.

In the present embodiment, the above-mentioned voltage applying unit may include the first electrode 48, the second electrode 52 and the power source 56.

The first liquid 44 has polarity or electrical conductivity, and is sealed within the container 42.

The second liquid 46 does not mix with the first liquid 44 and is sealed within the container 42.

In addition, the first liquid 44 and the second liquid 46 have equal specific gravity, and the first liquid 44 is such that its transmissivity is lower than the transmissivity of the second liquid 46.

The first liquid 44 and the second liquid 46 will be described in detail later.

On a portion on the inside of the side wall 4204 corresponding to the first liquid 44 is formed a hydrophilic film 58, and on a portion on the inside of the side wall 4204 corresponding to the second liquid 46 is formed a water-repellant film 60.

The hydrophilic film 58 is so configured that its wettability with respect to the first liquid 44 is higher than its wettability with respect to the second liquid 46. In other words, the hydrophilic film 58 is so configured that the angle of contact of the first liquid 44 in relation to the hydrophilic film 58 would be smaller than the angle of contact of the second liquid 46 in relation to the hydrophilic film 58.

The hydrophilic film 58 may be formed by, for example, applying a hydrophilic polymer or a surfactant on the inner surface of the side wall 4204, and various known materials may be used to this end.

The water-repellant film 60 is so configured that its wettability with respect to the second liquid 46 is higher than its wettability with respect to the first liquid 44. In other words, the water-repellant film 60 is so configured that the angle of contact of the second liquid 46 in relation to the water-repellant film 60 would be smaller than the angle of contact of the first liquid 44 in relation to the water-repellant film 60.

The water-repellant film 60 may be formed by applying, for example, a water-repellant agent of fluoride compounds and the like on the inner surface of the side wall 4204, and various known materials may be used to this end.

First, the second liquid 46 is injected into the receptacle space 42A of the container 42 and onto the edge wall 4202 on the side on which the water-repellant film 60 is provided, so that its fluid level is at the upper edge of the water-repellant film 60. Then, the first liquid 44 is injected thereonto, and the second liquid 46 and the first liquid 44 are sealed within the receptacle space 42A by taking out the air inside.

Thus, the entire area of the first liquid 44 located at the entire outer circumference of the inner surface of the edge wall 4202 where the first liquid 44 is located becomes electrically connected to the second electrode 52 by coming into contact therewith, and further, the entire area of the first liquid 44 located at the entire outer circumference of the receptacle space 42A faces the first electrode 48 with the insulation film 50, the hydrophilic film 58 and the water-repellant film 60 in-between.

Therefore, when a voltage is applied across the first electrode 48 and the second electrode 52 by the power source 56, a voltage is applied across the first liquid 44.

Next, operations of the optical device 40 will be described.

Figure 3:
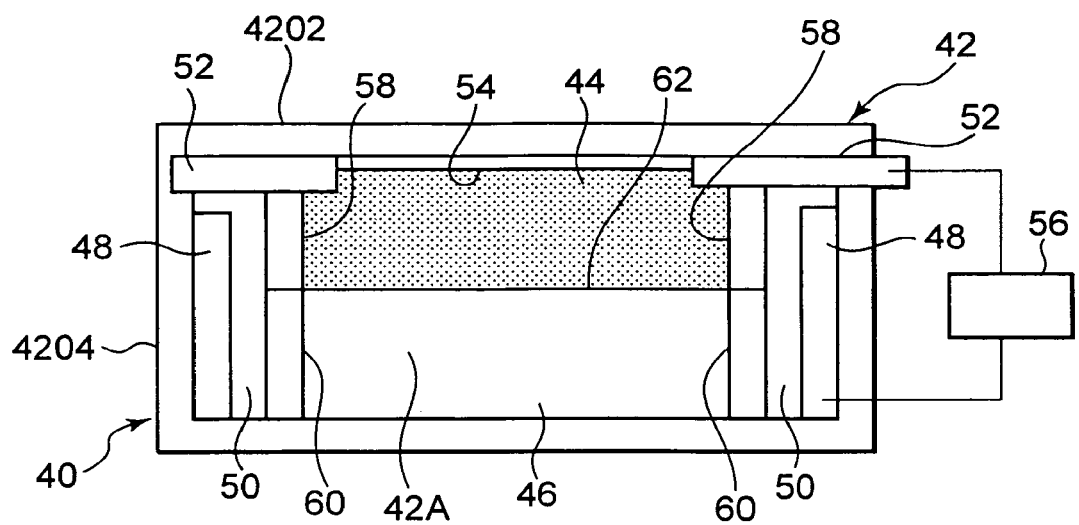
FIG. 3 illustrates a state where no voltage is applied to an optical device.
Figure 4:
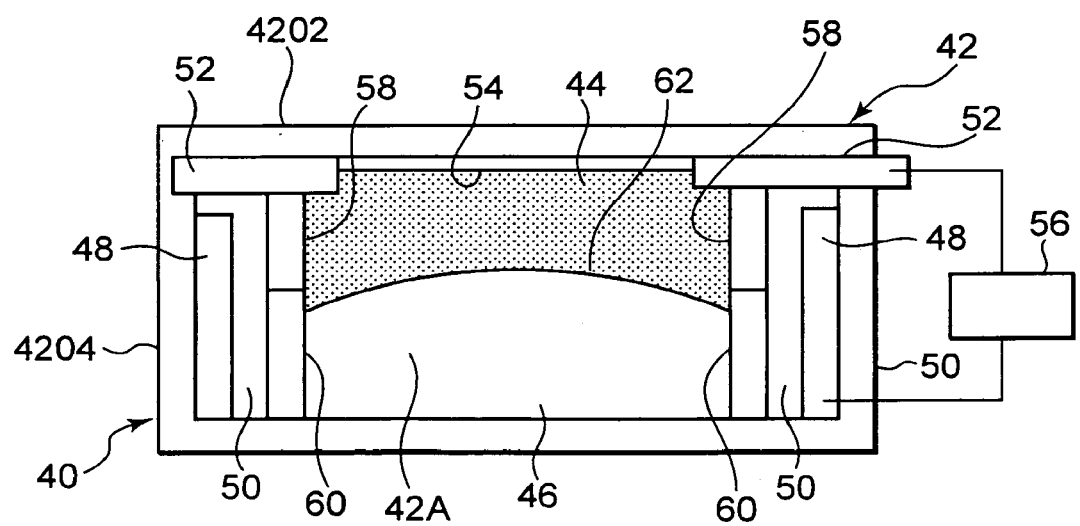
FIG. 4 illustrates a state where a first voltage E1 is applied to an optical device.
Figure 5:
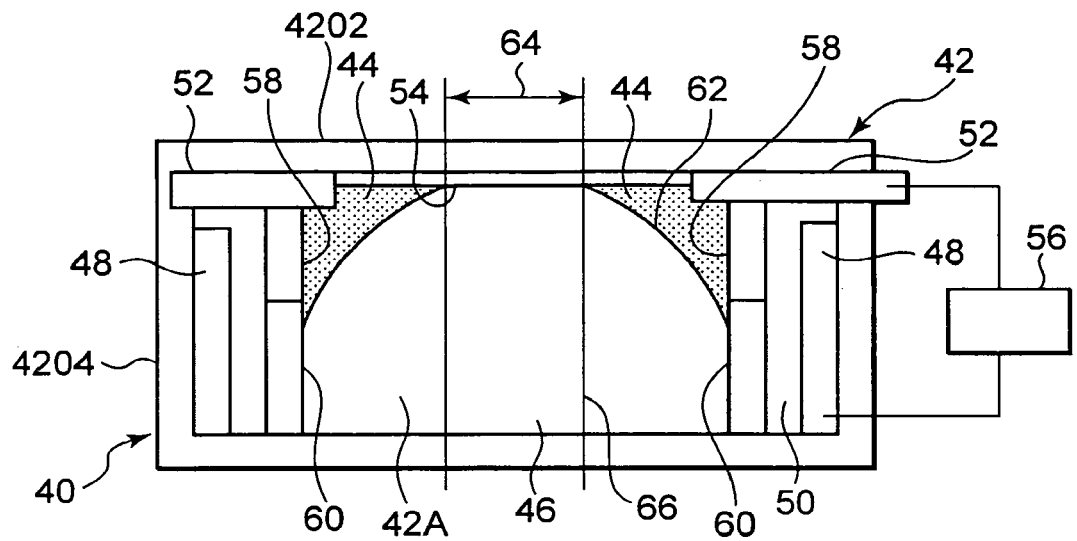
FIG. 5 illustrates a state where a second voltage E2 of a greater value than the first voltage E1 is applied to an optical device.
Figure 6:
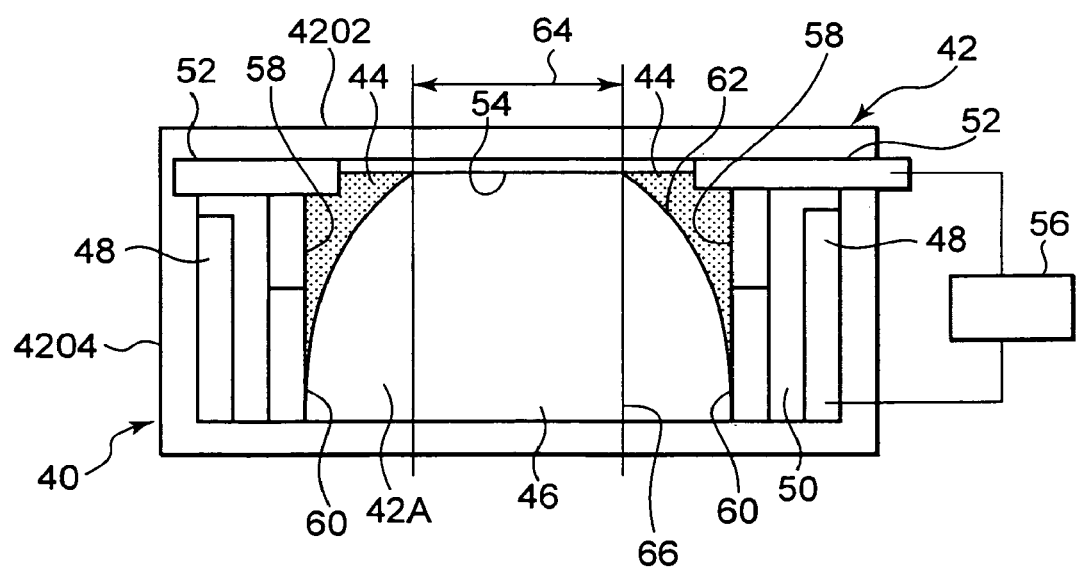
FIG. 6 illustrates a state where a third voltage E3 of a greater value than the second voltage E2 is applied to an optical device.

FIG. 3 illustrates a state where no voltage is applied to the optical device 40, FIG. 4 illustrates a state where a first voltage E1 is applied to the optical device 40, FIG. 5 illustrates a state where a second voltage E2 of a value greater than the first voltage E1 is applied to the optical device 40, and FIG. 6 illustrates a state where a third voltage E3 of a value greater than the second voltage E2 is applied to the optical device 40.

In a state where no voltage is applied across the first electrode 48 and the second electrode 52 from the power source 56 (E=0V), as shown in FIG. 3, the entire area of the first liquid 44 located at the entire outer circumference of the receptacle space 42A is in contact with the surface of the hydrophilic film 58, the angle of contact thereof is 90 degrees, the entire area of the second liquid 46 located at the entire outer circumference of the receptacle space 42A is in contact with the surface of the water-repellant film 60, and the angle of contact thereof is 90 degrees.

Therefore, an interface 62 formed between the first liquid 44 and the second liquid 46 is flat.

At this point, since the first liquid 44 extends across an entire area in a direction that is orthogonal to the direction in which light is transmitted, light that travels in the direction of the thickness of the container 42 is blocked.

When the first voltage E1 is applied across the first electrode 48 and the second electrode 52 from the power source 56 (where E1>0V), as shown in FIG. 4, due to electrocapillarity, the interface 62 changes its shape into a convex curved surface (spherical surface) that arches outward from the second liquid 46 toward the first liquid 44 such that the center of the interface 62 is now closer to one of the edge walls 4202. In other words, the thickness of the first liquid 44 is smallest (thinnest) at the center, and its thickness becomes greater (thicker) the further away it moves from the center toward the outer circumference of the receptacle space 42A.

At this point, the angle of contact of the first liquid 44 with respect to the water-repellant film 60 is smaller than 90 degrees, and at the side wall 4204 (the water-repellant film 60), the first liquid 44 enters the second liquid 46 along the side wall 4204.

When the second voltage E2 of a value greater than the first voltage E1 is applied across the first electrode 48 and the second electrode 52 from the power source 56 (where E2>E1), as shown in FIG. 5, the gradient of the convex curved surface (spherical surface) of the interface 62 becomes greater, and the center of the interface 62 touches one of the edge walls 4202 (the hydrophilic film 54).

As a result, the first liquid 44 ceases to be present on the edge wall 4202 (the hydrophilic film 54) where the interface 62 is in contact with, an area 64 where only the second liquid 46 is present is formed in the center of the receptacle area 42A (the center of both of the edge walls 4202), and a light transmission path 66 that passes through the edge walls 4202 and extends in the direction of the thickness of the container 42 is formed by way of this area 64.

When the third voltage E3 of a value greater than the second voltage E2 is applied across the first electrode 48 and the second electrode 52 from the power source 56 (where E3>E2), as shown in FIG. 6, the gradient of the convex curved surface (spherical surface) of the interface 62 becomes even greater.

The diameter of the area 64 formed in the center of the receptacle space 42A (the center of both of the edge walls 4202) where only the second liquid 46 is present is enlarged, and the diameter of the light transmission path 66 is enlarged.

Thus, by adjusting the voltage applied across the first electrode 48 and the second electrode 52 from the power source 56, it is possible to enlarge or reduce the diameter of the area 64 where only the second liquid 46 is present, and it is possible to perform aperture operations whereby the diameter of the light transmission path 66 is enlarged or reduced.

According to the present embodiment, when no voltage is applied, the angle of contact θ of the first liquid 44 with respect to the hydrophilic film 58 and to the water-repellant film 60 is 90 degrees, the angle of contact of the second liquid 46 with respect to the hydrophilic film 46 and to the water-repellant film 58 is 90 degrees, and the interface 62 is flat. Therefore, even if the dimension of the optical device 40 in the direction in which light is transmitted (the dimension in the direction of its thickness) is reduced, unlike conventional optical devices, it is possible to bring the second liquid 46 into contact with both of the edge walls 4202 reliably in a state where a voltage is applied.

Therefore, the light transmission path 66 can be formed reliably in a state where a voltage is applied, and it is advantageous in obtaining thinner devices.

Figure 12A:
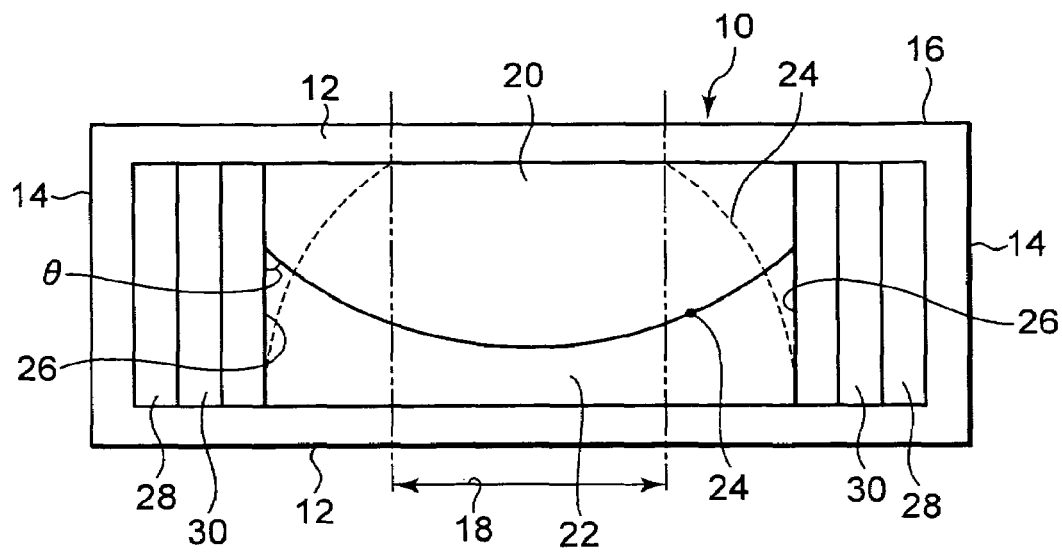
FIGS. 12A, 12B and 12C indicate the configuration of an optical device of related art, where
Figure 12B:
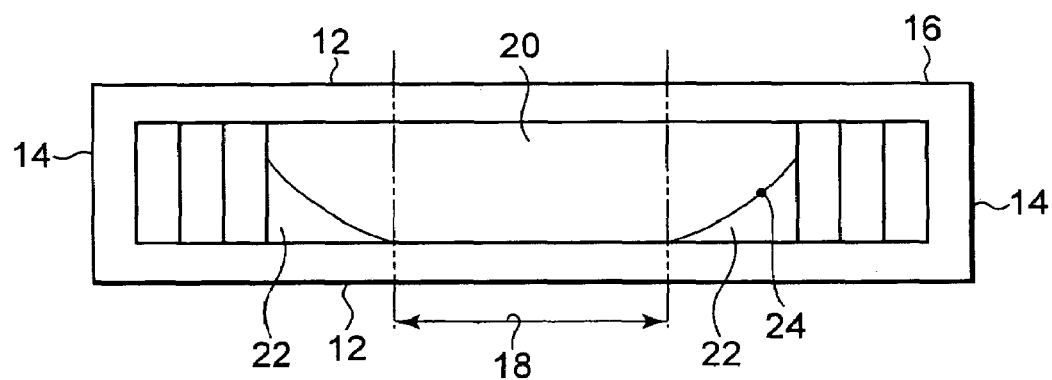
Figure 12C:
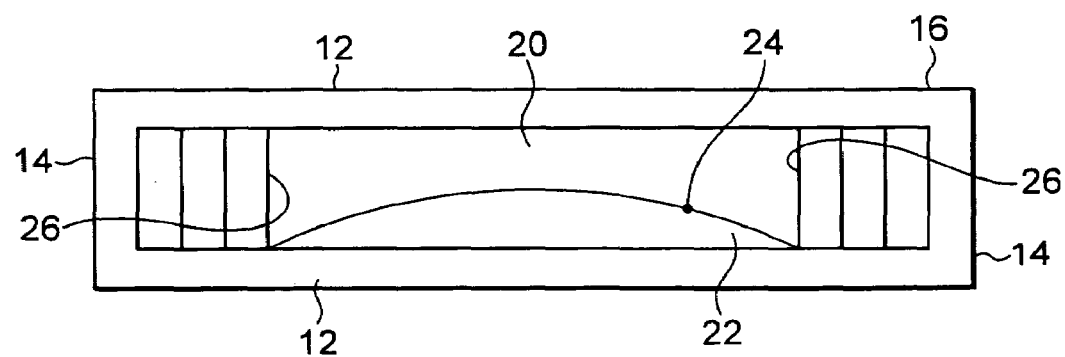

If, as is conventional, the interface 62 between the first and second liquids 44 and 46 takes on the form of a concave curved surface where the first liquid 44 curves out toward the second liquid 46 (see FIG. 12A), a situation arises where the second liquid 46 exists between the first liquid 44 and the first electrode 48, and therefore, since the voltage applied via the first electrode 48 is obstructed by the second liquid 46, it becomes more difficult to apply a voltage across the first liquid 44, electrocapillarity in the first liquid 44 cannot be brought about reliably, and it is disadvantageous in stabilizing aperture operations.

In contrast, in the present embodiment, since the interface 62 between the first and second liquids 44 and 46 is flat, the second liquid 46 never exists between the first liquid 44 and the first electrode 48. Therefore, the voltage applied via the first electrode 48 is applied across the first liquid 44 without being obstructed by the second liquid 46, and thus, electrocapillarity in the first liquid 44 can be brought about reliably, and it is advantageous in stabilizing aperture operations.

In addition, since the water-repellant film 60 is formed on the portion of the side wall 4204 corresponding to the second liquid 46, if the first liquid 44 comes to where the water-repellant film 60 is, the surface of the first liquid 44 moves smoothly over the water-repellant film 60, and it is advantageous in achieving faster aperture operations.

In addition, since the hydrophilic film 54 is formed on the edge wall 4202 on the side of the first liquid 44, the hydrophilic film 54 is very wettable with respect to the first liquid 44. Therefore, when the second liquid 46 moves away from the edge wall 4202 on the side of the first liquid 44 after having been in contact with that edge wall 4202, it is easier for the second liquid 46 to detach from the hydrophilic film 54, and it is advantageous in achieving faster aperture operations.

Next, the first liquid 44 and the second liquid 46 used in the embodiment above will be described.

The first liquid 44 is obtained by mixing three kinds of liquids each having a specific gravity and refractive index that are different from those of one another, and the present inventor discovered the fact that the specific gravity and refractive index of the first liquid 44 can be changed over a large range by changing the mixing ratio of these three kinds of liquids.

As an example, a case where the first liquid 44 is obtained by mixing two kinds of liquids will first be described.

The first liquid 44 will be obtained by mixing pure water and ethanol as the two kinds of liquids, and the mixing ratio thereof will be varied.

Figure 7:
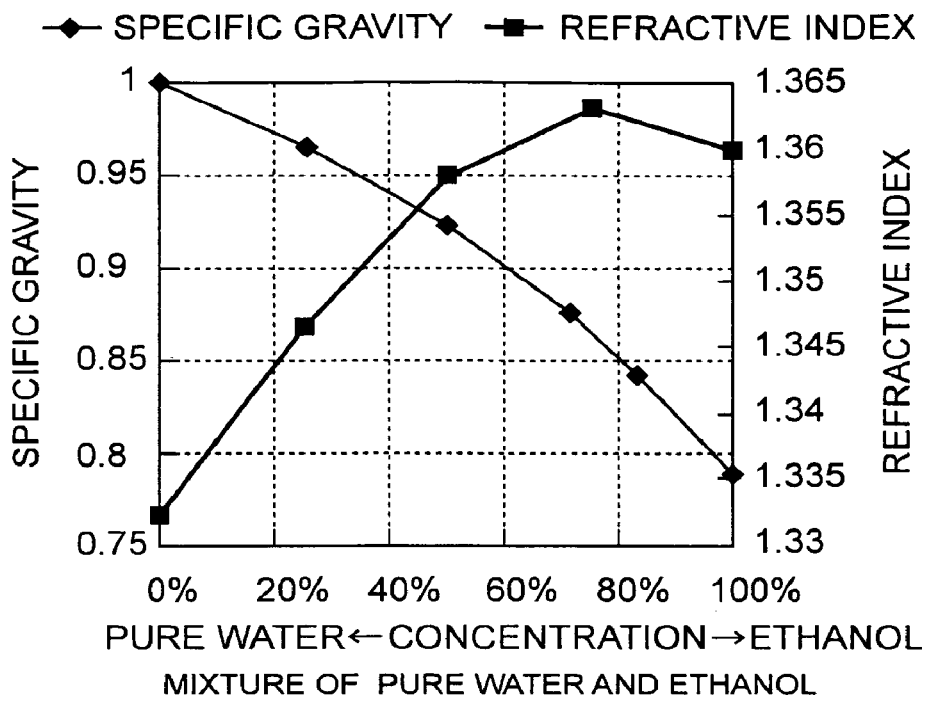
FIG. 7 is a line graph indicating the mixing ratio of pure water and ethanol and the specific gravity and refractive index properties thereof.

As shown in FIG. 7, as the mixing ratio of these liquids is varied, the specific gravity and refractive index of the first liquid 44 changes linearly or in a curve.

In addition, the first liquid 44 will be obtained by mixing pure water and ethylene glycol as the two kinds of liquids, and the mixing ratio thereof will be altered.

Figure 8:
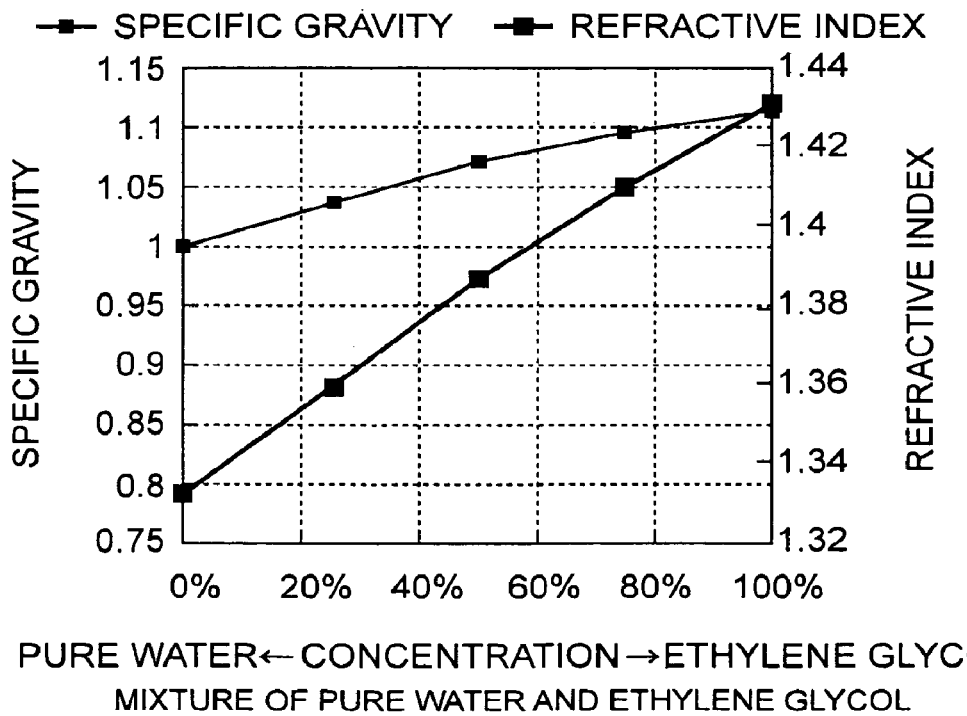
FIG. 8 is a line graph indicating the mixing ratio of pure water and ethylene glycol and the specific gravity and refractive index properties thereof.

As shown in FIG. 8, as the mixing ratio of these liquids is varied, the specific gravity and refractive index of the first liquid 44 changes linearly or in a curve.

It is noted that the specific gravity and refractive index of pure water are 1.0 and 1.333, respectively, that the specific gravity and refractive index of ethanol are 0.789 and 1.361, respectively, and that the specific gravity and refractive index of ethylene glycol are 1.113 and 1.430, respectively.

In contrast to the examples above, the first liquid 44 is next obtained by mixing three kinds of liquids, and the mixing ratio thereof is varied.

As an example, the first liquid 44 is obtained using pure water, ethanol and ethylene glycol as the three kinds of liquids, and the mixing ratio thereof is varied.

Figure 9:
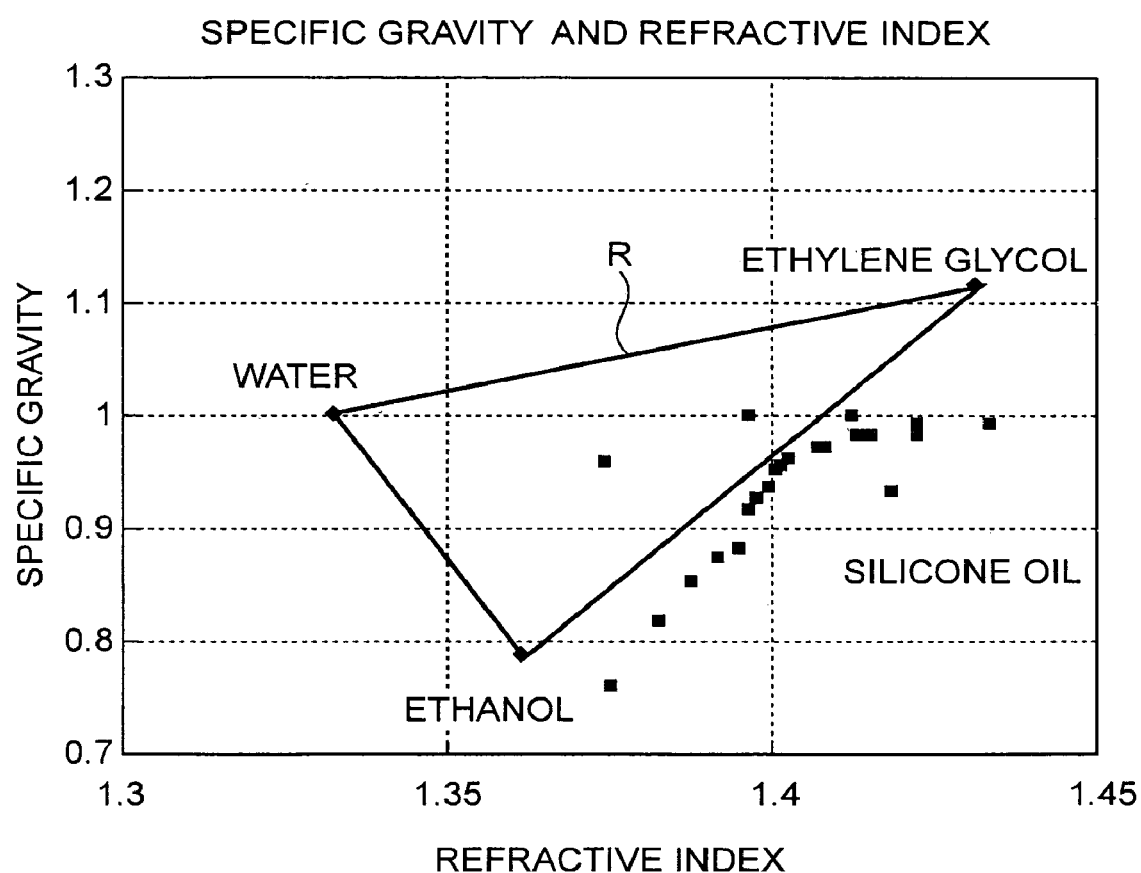
FIG. 9 is a graph indicating the specific gravity and refractive index of pure water, ethanol and ethylene glycol.

As shown in FIG. 9, by varying the mixing ratio of pure water, ethanol and ethylene glycol, it is possible to alter the specific gravity and refractive index of the first liquid 44 over a large range R that is obtained by joining the three coordinates for pure water, ethanol and ethylene glycol.

On the other hand, in FIG. 9, coordinates of the specific gravity and refractive index of various silicone oils that are commercially available are indicated.

Therefore, a commercially available silicone oil that falls within the triangular area R may be used as the second liquid 46, and the first liquid 44, which is obtained by mixing pure water, ethanol and ethylene glycol and whose specific gravity and refractive index are made equal to those of the silicone oil above, may be used.

In the present embodiment, the first liquid 44 is formed by dissolving carbon black in a mixture of pure water, ethanol and ethylene glycol, has a black color, is so formed that it can block light with a thickness of approximately 0.1 mm, and is advantageous in obtaining thinner optical devices.

By making the refractive index of the first liquid 44 and the refractive index of the second liquid 46 equal, occurrences of a lens effect at the interface 62 can be prevented, and it is advantageous in improving the reliability of aperture operations.

In addition, by forming the first liquid 44 by mixing ethanol in water, its freezing-point (melting-point) can be lowered, freezing in cold climates can be prevented, and the use of the optical device 40 in cold climates becomes possible.

In the present embodiment, the freezing-point of ethanol is −114 degrees Celsius, the freezing-point of ethylene glycol is −13 degrees Celsius, and it is possible to keep the freezing-point of the first liquid 44 at 40 degrees Celsius or below.

In addition, in the embodiment above, since three kinds of existing liquids with different values of specific gravity were mixed and used as the first liquid 44, as indicated by the area R in FIG. 9, variations over a wide range are possible.

In other words, when two kinds of liquids with different values of specific gravity are mixed, the specific gravity of the first liquid 44 that can be obtained by varying the mixing ratio of those two kinds of liquids can only be varied, as shown in FIG. 9, within the range of the line that joins the coordinates of those liquids.

In contrast, when three kinds of liquids are mixed, it becomes possible to vary the specific gravity of the first liquid 44 within the larger triangular area R that is obtained by joining the three coordinates for pure water, ethanol and ethylene glycol.

Therefore, it is easier to make the specific gravity of the first liquid 44 and the specific gravity of the second liquid 46 equal, and it is easier to obtain the optical device 40 with the desired properties.

Further, as shown in FIG. 9, since the first liquid 44 is obtained by mixing at least three kinds of liquids, for example, pure water, ethanol and ethylene glycol, that have not only differing values of specific gravity but differing refractive indices as well, while it is easier to make the specific gravity of the first liquid 44 and the specific gravity of the second liquid 46 equal, it is also easier to make the refractive index of the first liquid 44 and the refractive index of the second liquid 46 equal, and it is therefore advantageous in preventing the occurrence of a lens effect.

In addition, in the embodiment above, a case where the first liquid 44 is obtained by mixing pure water, ethanol and ethylene glycol as the several kinds of liquids is described, however, the several kinds of liquids to be used are not limited to pure water, ethanol and ethylene glycol, and various kinds of other existing liquids may also be chosen instead.

A description will be given with reference to FIG. 10 and FIG. 11.

Figure 10:
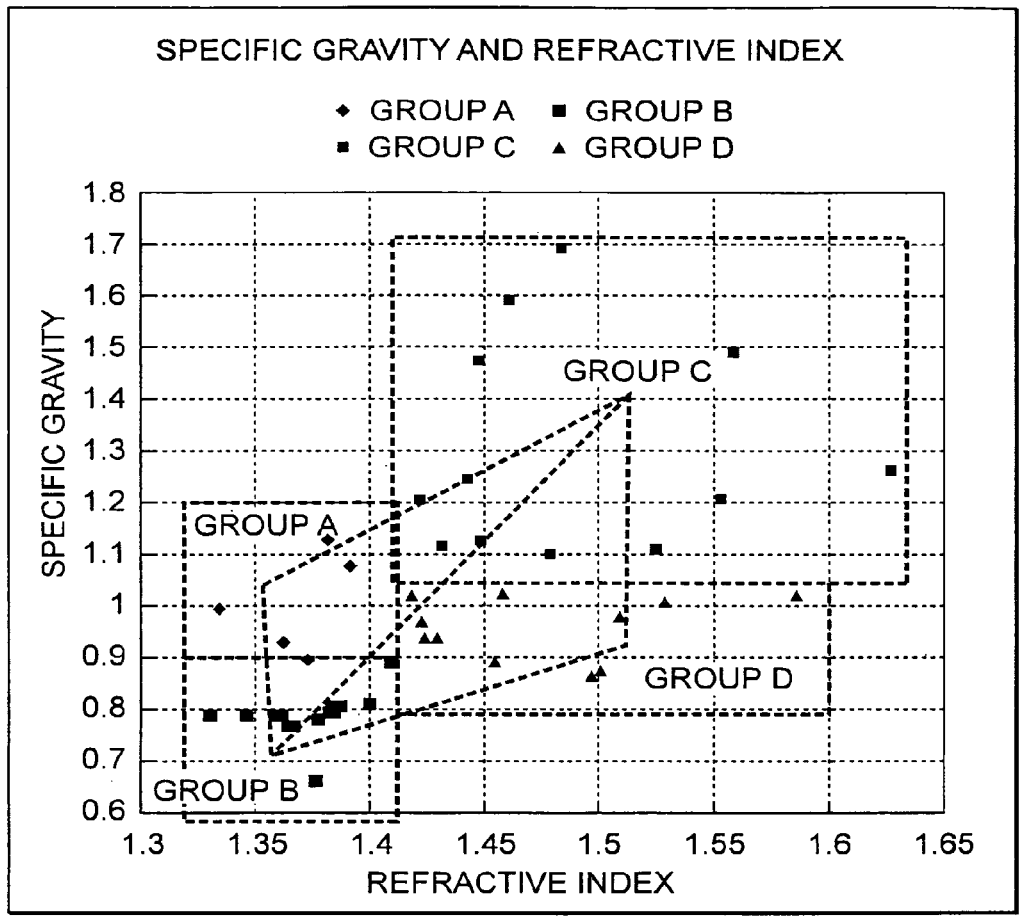
FIG. 10 is a graph indicating the specific gravity and refractive index of various kinds of liquids.

FIG. 10 is a graph indicating the specific gravity and refractive index of various kinds of liquids, and FIG. 11 is a graph indicating the values of specific gravity and refractive index of the various liquids to be used.

For example, as shown in FIG. 10, as liquids to be used, those that belong to group A, group B, group C and group D may be considered, and the actual names of liquids to be used in groups A to D are shown in FIG. 1.

As indicated with a triangular area R1 in FIG. 10, it is possible to vary the specific gravity and refractive index by varying, within the large triangular area R1 that is obtained by joining the coordinates of one liquid chosen from group A, another from group B, and another from group C as the three kinds of liquids, the mixing ratio of those liquids.

In addition, as shown with a triangular area R2 in FIG. 10, it is possible to vary the specific gravity and refractive index by varying, within the large triangular area R2 that is obtained by joining the coordinates of one liquid chosen from group B, another from group C, and another from group D as the three kinds of liquids, the mixing ratio of those liquids.

In other words, by choosing various known liquids and changing the mixing ratio thereof, it is possible to vary the specific gravity and refractive index with ease.

It is to be noted that the number of liquids to be used for the first liquid is not limited to three, and four or more kinds of liquids may be also be used.

In addition, in the embodiment above, a case where the first liquid 44 is so formed to be equal in specific gravity with the second liquid 46 by mixing several kinds of liquids, each having a different specific gravity and refractive index, is described, however, it is also possible to form the second liquid 46 by mixing several kinds of liquids, each having a different specific gravity and refractive index, so that its specific gravity equals that of the first liquid 44.

Further, in the embodiment above, a case where a single silicone oil is used as the second liquid 46 is described, however, several silicone oils that have differing properties, such as refractive index and specific gravity, are available, and while it is possible to choose one kind of silicone oil that has the desired properties and use it as the second liquid 46, it is also possible to select several kinds of silicone oils with differing properties, vary their mixing ratio, and use them as the second liquid 46 with the desired refractive index and specific gravity.

In addition, in the embodiment above, a case where electrocapillarity is brought about by applying a DC, voltage across the first liquid 44 is described, however, the voltage to be applied across the first liquid 44 is not limited to a DC voltage, and any kind of voltage, such as an AC voltage, pulse voltage, a voltage that fluctuates in steps, may be used so long as electrocapillarity can be caused in the first liquid 44.

The present document claims priority to Japanese Priority Document JP 2005-063324, filed in the Japanese Patent Office on Mar. 8, 2005, the entire contents of which are incorporated herein by reference to the extent permitted by law.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. An optical device, comprising:
    a sealed container that has edge walls and a side wall, the edge walls facing each other in a thickness direction of the container, the side wall connecting both of the edge walls;
    a first liquid that has polarity or electrical conductivity, the first liquid being sealed within the container;
    a second liquid that is sealed within the container and does not mix with the first liquid; and
    voltage applying means for applying a voltage across the first liquid; wherein:
    the first liquid and the second liquid have equal specific gravity;
    transmissivity of the first liquid is lower than the transmissivity of the second liquid;
    an interface between the first liquid and the second liquid changes shape in response to a voltage applied by the voltage applying means;
    a light transmission path that passes through the edge walls and extends in a direction of the thickness of the container is formed;
    a hydrophilic film that is formed on a portion inside the side wall corresponding to the first liquid, wettability of the hydrophilic film with respect to the first liquid being higher than wettability of the hydrophilic film with respect to the second liquid;
    a water-repellant film that is formed on a portion inside the side wall corresponding to the second liquid, wettability of the water-repellant film with respect to the second liquid being higher than wettability of the water-repellant film with respect to the first liquid;
    the voltage applying means includes a first electrode provided on an entire circumference of the inside of the side wall and a second electrode provided along an outer circumference of the inside of the edge wall on a side on which the first liquid is located;
    the hydrophilic film and the water-repellant film are provided so as to cover a surface of the first electrode;
    another hydrophilic film is formed on an inner portion of the second electrode and on the inside of the edge wall on a side on which the first liquid is located; and
    wettability of the another hydrophilic film with respect to the first liquid is higher than wettability of the another hydrophilic film with respect to the second liquid.

2. The optical device according to claim 1, wherein:
the interface is formed in a plane that is orthogonal to the thickness direction of the container;
the hydrophilic film is provided on a portion on the inside of the side wall corresponding to the first liquid along an entire circumference; and
the water-repellant film is provided on a portion on the inside of the side wall corresponding to the second liquid along an entire circumference.

3. The optical device according to claim 1, wherein:
the voltage applying means includes a first electrode provided on an entire circumference of the inside of the side wall and a second electrode provided along an outer circumference of the inside of the edge wall on a side on which the first liquid is located; and
the hydrophilic film and the water-repellant film are provided so as to cover a surface of the first electrode.

4. An optical device, comprising:
a hydrophilic film between a first liquid and a side wall;
a water-repellant film between a second liquid and said side wall, said first liquid being between said second liquid and an edge wall;
another hydrophilic film between said second liquid and said edge wall, said first liquid being between said another hydrophilic film and said second liquid,
wherein said hydrophilic film is between said water-repellant film and said edge wall, light being transmissible through said edge wall.

5. The optical device according to claim 4, wherein said side wall is formed in the shape of a hollow cylinder.

6. The optical device according to claim 4, wherein a container includes said side wall and said edge wall.

7. The optical device according to claim 6, wherein said side wall is in contact with said edge wall and another edge wall to seal a receptacle space of said container, said first and second liquid being within said receptacle space.

8. The optical device according to claim 4, wherein an insulation film is between said side wall and a first electrode.

9. The optical device according to claim 8, wherein said first electrode is between said side wall and said hydrophilic film.

10. The optical device according to claim 8, wherein said first electrode is between said side wall and said water-repellant film.

11. The optical device according to claim 4, wherein said first liquid has polarity or electrical conductivity.

12. The optical device according to claim 4, wherein an interface between said first liquid and said second liquid changes shape in response to a voltage applied across said first liquid.

13. The optical device according to claim 4, wherein said second liquid does not mix with said first liquid.

14. The optical device according to claim 4, wherein the transmissivity of said first liquid is lower than the transmissivity of said second liquid, the specific gravity of said first and second liquids being equal.

15. The optical device according to claim 4, wherein said another hydrophilic film allows transmission of said light.

16. The optical device according to claim 4, wherein wettability of the hydrophilic film with respect to said first liquid is higher than said wettability of the hydrophilic film with respect to said second liquid.

17. The optical device according to claim 4, wherein wettability of the water-repellant film with respect to said second liquid is higher than said wettability of the water-repellant film with respect to said first liquid.

18. The optical device according to claim 4, wherein wettability of the another hydrophilic film with respect to said first liquid is higher than said wettability of the another hydrophilic film with respect to said second liquid.

19. The optical device according to claim 4, wherein said another hydrophilic film is on said first electrode.

* * * * *